J. D. LALOR & F. L. JAHN.
AUTOMATIC STOP VALVE.
APPLICATION FILED AUG. 27, 1910.
1,103,058.
Patented July 14, 1914.
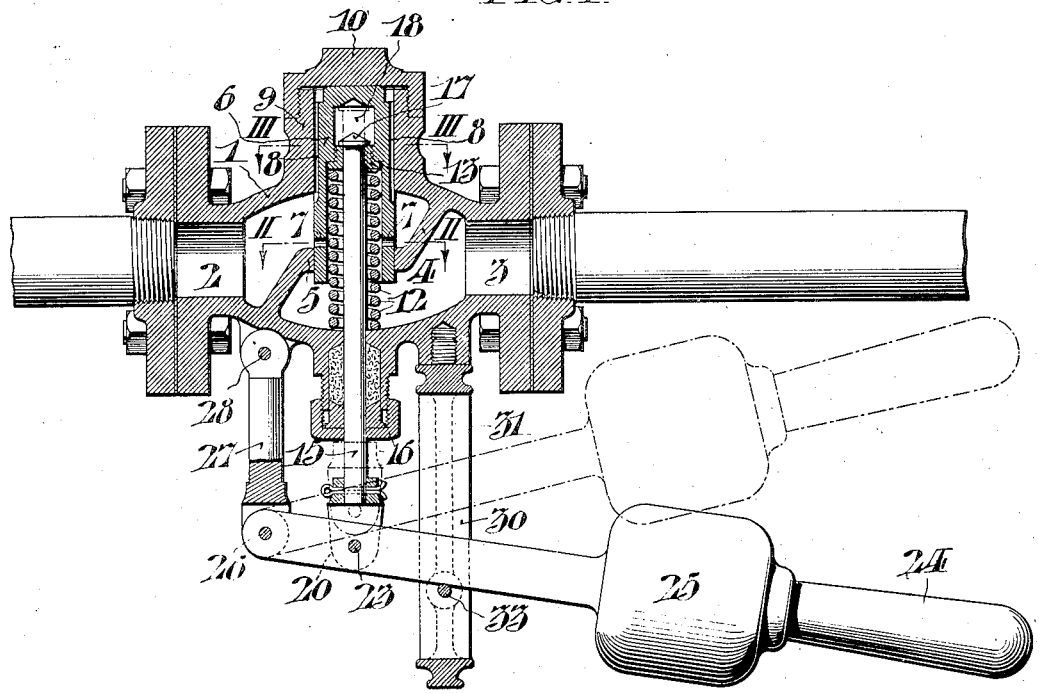
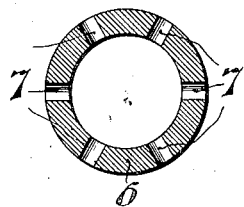
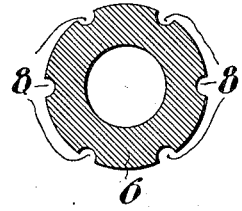
Inventors
James D. Lalor,
and
Frederick L. Jahn,

UNITED STATES PATENT OFFICE.

JAMES D. LALOR AND FREDERICK L. JAHN, OF PHILADELPHIA, PENNSYLVANIA; SAID JAHN ASSIGNOR, BY MESNE ASSIGNMENTS, TO SAID LALOR.

AUTOMATIC STOP-VALVE.

1,103,058.  Specification of Letters Patent.  Patented July 14, 1914.

Application filed August 27, 1910. Serial No. 579,236.

*To all whom it may concern:*

Be it known that we, JAMES D. LALOR and FREDERICK L. JAHN, of the city of Philadelphia, in the county of Philadelphia and State of Pennsylvania, have invented certain new and useful Improvements in Automatic Stop-Valves, whereof the following is a specification, reference being had to the accompanying drawings.

The invention consists in a stop valve to be interposed within a pipe through which fluid flows and which freely permits the normal flow of the fluid through the pipe, but automatically closes and checks such flow in case of a break or serious leakage in the pipe. Such valve is useful as affording a safety device to be used in connection with the feeding of liquid fuel in lighting, heating or power plants, or the like. It is important in these plants that the liquid fuel shall be freely fed through the pipe to the source of combustion, and also that in case of break or leak in the pipe through which the fuel is fed the supply shall be instantly wholly cut off in order to insure protection from flooding and danger of fire.

The valve which we have invented and which we will describe, is exceedingly sensitive. Its operation is dependent directly upon the relative pressures in the pipe on the one side and the other of the valve.

In the case of a supply pipe for liquid fuel, the orifice through which the fuel is fed is necessarily of such restricted character, as compared with the valve orifice, as to maintain under normal conditions a substantially equal pressure on the two sides of the valve, but in case of a break or leak beyond the valve, abnormally increasing the outflow of the liquid fuel, the pressure condition is changed and the excessive pressure on the supply side of the valve effects the instantaneous closing thereof, cutting off all further supply until the break or leak has been closed.

In the accompanying drawings, Figure I, is a longitudinal section through a valve embodying our invention. Fig. II, is a partial cross section on an enlarged scale of the cylindrical valve along the line II, II, of Fig. I. Fig. III, is a similar section along the line III, III.

The valve is set in a casing 1, provided with an inlet chamber 2, and an outlet chamber 3, separated by a partition 4, provided with a horizontal component 5, pierced by a circular orifice for the reception of the cylindrical valve 6, which plays vertically in this orifice. The valve is in the form of a cylinder open at the lower end and closed at the top. It is provided with a ring of lateral apertures 7, 7, together constituting the normal valve aperture, and also near its upper end with a set of lateral channels 8, by means of which fluid pressure from the inlet chamber is maintained constantly upon the upper closed end of the cylinder. This upper end of the cylinder is received within a dome 9, closed by a screw cap 10. The sides of the dome in combination with the valve seat restrict the movement of the valve cylinder to a true axial reciprocation, the upward extent of which is limited by the position of the screw cap, the lower surface of which is however not so truly ground to the upper end of the cylinder as to prevent fluid pressure from acting at all times upon practically the entire surface of the upper end of the cylinder. When in this upper or advanced position the fluid which is fed through the pipe has free passage from the inlet chamber through the apertures 7, to the interior of the valve cylinder and thence out at the bottom of the cylinder to the outlet chamber, but when the valve falls or is retracted within the orifice to an extent equal to or greater than the diameter of these apertures, the valve is closed. The valve floats in the liquid or other fluid which is passing through and fills the pipe, having equal pressure surfaces exposed to the fluid in the inlet and outlet chambers. The coiled spring 12, interposed between a shoulder 13, on the interior of the cylinder, and the base of the casing, has sufficient upward strength to overcome with a slight margin, the specific gravity of the cylinder within the fluid in which the valve rests. Accordingly, under normal circumstances, the pressures on the upper and lower ends of the cylinder being equal, the valve rises to the upper extremity of its play, opening the apertures 7, and permitting free flow of fluid therethrough; but, upon the establishment of any substantial difference of pressure, such as occurs in case of a break in the pipe beyond the valve, the valve cylinder is forced down against the slightly resisting action of the spring and is closed, remaining so until opened by the means now to be described. The valve is extremely sensitive virtually floating in the liquid and in closing involves no coincident motion on the part of any valve stem or other packed member, thereby insuring immediate response to even slight variations of pressure.

A vertical stem 15, enters the valve chamber on its lower side, its entrance being protected by a suitable stuffing box 16. This stem passes up through the coiled spring and terminates in a head 17, which is received within the auxiliary chamber 18, forming the upper end of the interior of the cylinder, and separated from the other parts of the interior by the nut 13, against which the spring bears. The stem 15, passes freely through this nut, and the length of the stem 15, is such that under normal conditions, the valve cylinder is free to fall to its lower position, in which it is in contact with the head of the stem. To thrust the stem up, in order to open the valve after closure has occurred, the following connections are provided; the lower end of the stem is secured to a yoke 20, by a cotter pin 23. The fork of the yoke is pivoted to a hand lever 24, bearing a weight 25, and pivoted at 26, to a link 27, which is in turn pivoted at 28, to the lower side of the valve casing. The play of the hand lever is directed and limited by a slot 30, within which the lever is received, cut in a depending post 31, with interposition of a pin 33, which in its normal position of insertion, limits the downward movement of the lever, but when withdrawn permits the lever to fall further, as is useful in case of disassemblage of the valve parts, or to manually and positively close the valve, or to reciprocate the valve for cleaning purposes. The weight 25, is sufficient to normally hold the hand lever and, therefore, the stem 15, at the lower extremity of the play, permitted by the pin 33, in which position it exercises no restraining action upon the valve cylinder, leaving it free to fall instantly upon the establishment of pressure conditions calculated to close the valve. After the valve has thus been closed, the hand lever must be pulled up manually to thrust the stem up and raise or open the valve, but, when this has been done, provided normal fluid pressures have again been reëstablished, the valve remains in its upper and open position, notwithstanding the immediate return of the hand lever and stem, when the hand lever is released. It is important that this means for opening the valve after its closure, should be of such character and so protected that the valve cannot be held in its open position, by any proper manipulation thereof, but must always be in position to immediately close automatically upon the occurrence of the exigencies against which the valve is provided.

It will be seen that in our valve the movement required to close the valve is solely that of the valve plunger, which floats within an inclosed casing and is entirely inaccessible to wrongful manipulation. Nor is there any valve stem which by being frozen or tightened in its stuffing box may prevent the valve from acting.

By our construction nothing short of wilful tampering with the device, such as improperly tying the hand lever in its upper position, can prevent the immediate restoration of the parts to a position which leaves the valve operative in case of the establishment of the conditions to guard against which it is provided.

Having thus described our invention, we claim:—

1. In an automatic stop valve, a partition in the fluid channel; an orifice in the partition; a hollow valve cylinder closed at the top and adapted to reciprocate in the orifice; an aperture in the side of the cylinder, permitting fluid to flow through the valve only when the valve cylinder is so far advanced within the orifice that said aperture has cleared the partition; a spring whereby said valve cylinder is held in said advanced position; and means allowing the fluid pressure on both sides of the partition to have equal access to the valve, whereby excess of pressure on the inlet side automatically retracts the valve cylinder within its orifice against the pressure of said spring with closure of the valve.

2. In an automatic stop valve a partition having a horizontal component, with valve orifice therein, interposed within the channel of fluid communication; a hollow cylindrical valve, closed at top and open at bottom, occupying said orifice with capacity for axial reciprocation therein, and receiving on its upper surfaces the fluid pressure of the inlet side of the valve, and on its lower surfaces the fluid pressure of the outlet side of the valve; a spring pressing the hollow cylindrical valve upward with sufficient strength to counterbalance the specific gravity of the cylindrical valve in the liquid which fills the valve; apertures in the side of the cylinder adapted to establish free communication between the inlet side of the valve and the interior of the valve cylinder, and thence to the outlet side of the valve, when the valve cylinder is in its upper position, but adapted to be moved to a position within the valve orifice, with closure of the valve, when the latter is in its lower position; whereby under conditions of equal fluid pressure on both sides of the valve cylinder, it is held in its upper and open position, but is depressed and the valve closed upon the establishment of an excess of pressure on the inlet side.

3. In an automatic stop valve provided with a valve orifice, a hollow cylindrical valve reciprocating within said orifice, and floating within the fluid passing through the valve, whereby it is driven down and closed by excessive pressure of fluid on the inlet side of the valve; said cylinder being apertured at the side so as to permit the flow of fluid through it when the valve is in its open position, and being free from positive connection with any moving part which extends without the valve casing.

4. In an automatic stop valve, the combination of the valve; means whereby the valve which is normally open when the fluid pressures on either side are substantially equal, is automatically closed by excess of fluid pressure on the inlet side, a weighted lever without the valve casing and a nonpositive connection between said weighted lever and the valve whereby the raising of the weighted lever opens the valve when it is closed although its subsequent lowering does not close the valve.

In testimony whereof we affix our signatures in presence of two witnesses.

JAMES D. LALOR.
FREDERICK L. JAHN.

Witnesses:
CHARLES E. WILLIAMS,
R. C. WRIGHT.